United States Patent Office 3,545,945
Patented Dec. 8, 1970

3,545,945
WELDING COPPER-NICKEL ALLOYS
Walter A. Petersen, Ridgewood, N.J., assignor to The International Nickel Company, Inc., New York, N.Y., a corporation of Delaware
No Drawing. Filed Feb. 26, 1968, Ser. No. 707,967
Int. Cl. B32b 15/20; C22c 9/06
U.S. Cl. 29—199                                                6 Claims

ABSTRACT OF THE DISCLOSURE

A welding material for use in welding chromium-strengthened copper-nickel-base alloys of prescribed composition, the welding material containing copper, nickel, chromium, manganese, silicon and small amounts of titanium and zirconium. Chromium does not exceed 2.8% and is specially controlled in relation to the percentage of chromium in the copper-nickel-base alloy such that the total chromium is less than 6.4%.

---

Although copper-nickel alloys, commonly referred to as cupronickels, of the conventional 70–30 type have been extensively used commercially for a considerable period of time, it was not until recently that a significant commercial metallurgical breakthrough was brought about in respect of the mechanical characteristics thereof. By incorporating about 2.4% to 3.8% chromium in such alloys (the compositions of which are more completely set forth in the U.S. application of Frank A. Badia and Gary N. Kirby, Ser. No. 581,066, filed on Sept. 21, 1966), it was discovered that yield strength could be markedly enhanced by a factor of at least twofold, i.e., from about 18,000–20,000 pounds per square inch (p.s.i.) to at least 40,000 p.s.i. And at the higher chromium levels, yield strengths upwards of 60,000 p.s.i. were obtainable. Thus, the theretofore characteristically low strengths of this group of important alloys would no longer preclude their use in various applications, applications in which advantage might otherwise be taken of other notable properties such as resistance to corrosive marine environments.

However, as is not uncommon with new developments, subsequent but related difficulties can arise and in this instance a welding problem was encountered. Attempts to weld, particularly in the restrained condition (as is typical of field conditions), 70–30 type cupronickel containing essentially about 28% to 32% nickel and chromium over the range of 2.4% to 3.8% with a matching filler, i.e., a filler having essentially the same composition as the base material, often resulted in welds of unacceptable quality due to weld cracking and other undesirable defects. In fact, the first attempts at welding resulted in failure. Too, as further experimental investigation proceeded, the problem proved to be one of inconsistency. That is to say, excellent welding characteristics were indeed obtainable—but not always; on other occasions weld deposits were unsound and conspicuous by their sensitivity to cracking. Since weldability of an alloy is so vitally important to commercial success in so many different areas of application, it became a prime ultimate objective to ascertain "the why" behind the weld cracking; otherwise, commercial exploitation of an alloy of great potential might be seriously thwarted or impaired, an obvious expectancy flowing from the attendant uncertainty—is it or is it not satisfactorily weldable  And it should be added that the self-suggestive possibility of pretesting every commercial heat coming off a production line would hardly be a panacea. A more practical solution was required.

In any event, it has now been discovered that sound, high strength, substantially crack-free copper-nickel-chromium welds, welds which are nonporous, ductile, tough and corrosion resistant, can be produced provided a special copper-nickel-chromium welding material (element) of controlled composition is employed. Such characteristics obtain using conventional inert gas shielded arc-welding. Moreover, post-weld heat treating is not required and this is a significant attribute since the welding of large structural components is thus facilitated. The difficulties of heat treating the weld heat affected zones of, say, huge pressure vessels is too well documented to further consider herein.

It is an object of the present invention to provide a welding rod material or element, i.e., a filler metal, rod, or bare electrode, etc., for welding chromium-containing 70–30 type cupronickel.

The invention also contemplates providing a chromium-containing 70–30 type cupronickel welded structure characterized by sound, high strength, substantially crack-free weld deposits.

Another object of the invention is to provide a process for producing sound, high strength, substantially crack-free, ductile corrosion resistant inert gas shielded arc-welds in chromium-containing 70–30 type cupronickel alloys.

Other objects and advantages will become apparent from the following description.

Generally speaking and in accordance herewith, it has been found that the above problem of weld cracking is greatly influenced by the amount of chromium present in the parent metal to be welded, to wit, the copper-nickel alloys described in the aforementioned U.S. application Ser. No. 581,066 and which contain about 24% to 38% nickel in addition to about 2.4% to 2.8% chromium. Moreover, the amount of chromium and also silicon in the welding material also play an important role. When these and other variables are controlled as herein described, excellent welds can be obtained consistently.

To further explain—it has been determined that within the chromium range of about 2.4% to less than 2.8% in the base metal, sound, crack-free, nonporous welds can be obtained using a filler metal of matching composition. Thus, there is no problem. When, however, the chromium level exceeds 2.8% in the parent metal, the problem can take hold with resultant severe cracking. At any rate, it has been further determined that when the amount of chromium in the welding element is less than about 2.8% and when sufficient silicon is present, parent metal alloys containing more than 2.8% chromium are satisfactorily amenable to welding. This permits utilization of the highest strength alloys in the welded condition.

The exact mechanism which might possibly explain the phenomenon involved is not completely understood. Without being bound to any particular theory, it is thought that the presence of chromium in the alloy might create a situation somewhat similar to that encountered in low melting point eutectics. Generally speaking and as is known, there is seemingly a greater tendency for hot cracking to occur in alloys which contain impurities such as phosphorus and sulfur because they form low melting point eutectics. This form of cracking is related at least in part to the difference in solidification temperatures of the first solid to form and last liquid present—the greater the difference in temperatures, the greater the propensity to crack. Now, chromium additions to the copper-nickel system increase the liquidus temperature sharply, the solidus temperature remaining substantially constant. This sharp increase in temperature brings about a situation similar at least in some respects to that encountered with the aforementioned eutectic, i.e., a substantial difference between solidus and liquidus temperatures. Thus, it is not unreasonable to surmise that a critical chromium level might then exist under a specific set of test conditions at which cracking would most likely occur. Whatever be the theoretrical explanation, suffice to say that using the X-weld crack test and chromium contents above 2.8%, cracking can be made to occur virtually every time. (Under less severe conditions, the critical chromium content would be greater; for example, sheet welds can be made with sheet containing 3.2% chromium and without the addition of filler and without cracking; however, the invention is directed to obviating the problem irrespective of the thickness of the base alloy to be welded.)

The welding element contemplated herein should contain about 26% to 37%, e.g., 28% to 32%, nickel, about 1.9% to less than 2.8% chromium, e.g., about 1.9% to 2.75% chromium, with the proviso that the combined chromium content of the cupronickel alloy base and the welding element not exceed 6.4% and, most advantageously, not exceed 6%, at least 0.4%, e.g., above about 0.5%, and up to 2% manganese, about 0.2% to less than 0.6% silicon, titanium in a small but effective amount sufficient to confer good hot working characteristics, e.g., about 0.02%, and up to 0.5%, a small but effective amount, e.g., about 0.02%, of zirconium to impart, in conjunction with the titanium, good hot workability, the upper zirconium limit being about 0.3%, up to about 1% iron, up to about 0.1% carbon with the balance of the composition being essentially copper and the usual or common impurities associated therewith. In addition to being characterized by freedom from deleterious cracks, objectionable porosity and other defects, the weld deposits manifest a high yield strength in the as-welded condition (i.e., without the benefit of postweld heat treatmen), e.g., in excess of about 50,000 p.s.i. when the cupronickel alloy base material is in the form of plate and in excess of about 40,000 p.s.i. when the base material is in sheet form (e.g., about ⅛ inch or less in thickness), good impact toughness, excellent ductility, and good sea water corrosion resistance.

In carrying the invention into practice, careful control in respect of the composition of the welding element should be exercised. The chromium content should not be less than about 1.9% in order to maintain adequate strength in the welded joint and percentages in excess of about 2.8%, as indicated above and as will be demonstrated herein, can result in severe cracking in the weld. Furthermore, the sum of the chromium in the base alloy and welding element must be less than about 6.4% and beneficially not more than 6% to avoid destructive cracking. For a highly satisfactory combination of strength and ductility, the chromium content of the welding element advantageously is from 2.3% to 2.7%. Manganese should be at least 0.4% and advantageously above 0.5%. At lower levels difficulty in melting of the welding element may be experienced, i.e., the element may perform in a sluggish manner. It also acts to tie up sulfur and performs as a deoxidant. Above about 2%, manganese does not seem to impart much by way of positive benefit. Excellent results have been achieved with manganese levels over the range of 0.6% or 0.8% to 1.2% or 1.5%.

Silicon in an amount of at least about 0.2% is necessary for deoxidation and to impart sufficient fluidity to the weld puddle or pool for ease of placing the weld correctly. Appreciably lower silicon levels (0.1%) tend to favor cracking (i.e., welds exhibit a tendency to crack and difficulty has been experienced making satisfactory weld joints), notwithstanding the fact that the amount of chromium in the parent metal is less than 2.8%. In an amount above about 0.6% or even 0.5%, silicon detracts from toughness and ductility of the weld deposit. Advantageously, the percentage of silicon should be maintained within the range of 0.25% to 0.5%.

Important to processing the welding material into various forms, e.g., wire, are both titanium and zirconium which in small but effective amounts greatly assist in minimizing hot working difficulties. Titanium performs as a deoxidant and importantly contributes to good cold workability as well. It should not exceed about 0.5% since higher amounts do not impart further benefits. If, however, a filler rod were cast and used as such, titanium would not be necessary. A titanium range of about 0.02% or 0.05% to 0.2% is highly beneficial as is zirconium in amounts between about 0.02% to 0.3%, e.g., about 0.05% to 0.25%. Since titanium and zirconium are not recovered completely in processing, care should be exercised in this regard. For example, in making a filler metal the actual retained zirconium content may be as low as 0.05% even though 0.2% was added (about 75% of the addition being lost). Iron in amounts up to about 1% can be present in the welding element and carbon should not exceed about 0.1% and beneficially is kept as low as possible, e.g., less than 0.05% or 0.03%, to prevent tie-up of chromium through chromium carbide formation.

For the purpose of giving those skilled in the art a better understanding of the invention, the following illustrative examples are given.

EXAMPLE I

Using plate material 2 inches in width by 8 inches in length and ½ inch thick and conventional gas shielded (argon) tungsten-arc welding technique, butt-welded joints were formed. The plates were beveled at a 30° angle, with a 1/16 inch root face, a 3/32 inch root space, and were welded in the severely restrained condition (accomplished by clamping the same securely to a 2 inch thick copper-faced steel platen using four heavy duty C clamps).

The compositions of the base plates and filler metal, which was of a matching composition are given below:

TABLE I

| Weld component | Ni, percent | Cr, percent | Mn, percent | Si, percent | Ti, percent | Zr, percent | Fe, percent | Cu, percent |
|---|---|---|---|---|---|---|---|---|
| Base plate | 30 | 3.5 | 0.5 | 0.12 | 0.1 | | 0.7 | Bal. |
| Filler metal | 30 | 3.5 | 0.5 | 0.12 | 0.1 | | 0.7 | Bal. |

NOTE: Bal.=Balance essentially copper and impurities.

The filler material was prepared by air melting in a magnesia crucible in an induction furnace, the resulting ingots being then hot and cold worked to 5/32 inch diameter wire and centerless ground to remove surface contamination.

Although the first weld pass was completed successfully, difficulty was experienced because of inadequate fluidity of the filler metal. During the second pass, however, severe cracking was encountered. This crack extended into the first pass and was so severe the welding process was discontinued. The weld deposit composition was not analyzed and because of severity of the crack, mechanical characteristics were not determined.

EXAMPLE II

Using the same technique described in Example I, ½ inch thick plates were butt welded, the plates being 3 inches wide, 6 inches in length and ½ inch in thickness. In this instance the base alloy was of higher chromium content than in Example I but the chromium level of the filler material was lower. The composition of the base plate, filler wire, and weld deposit were as follows:

TABLE II

| Weld component | Ni, percent | Cr, percent | Mn, percent | Si, percent | Ti, percent | Zr, percent | Fe, percent | Cu, percent |
|---|---|---|---|---|---|---|---|---|
| Base plate | 29.1 | 3.75 | 0.43 | 0.05 | 0.1 | 0.2 | 0.82 | Bal. |
| Filler metal | 28.8 | 2.8 | 0.66 | 0.1 | 0.04 | 0.01 | 0.69 | Bal. |
| Weld deposit | 29 | 2.98 | 0.66 | 0.13 | 0.048 | 0.019 | 0.82 | Bal. |

NOTE: Bal.=Balance essentially copper and impurities.

The weld deposit was completed in nine passes and there was no visual evidence of cracking during or after welding although welding did proceed rather sluggishly.

Upon radiographic examination, however, a crack was discovered, the crack being about ¾ inch from one end and ½ inch in length. In this regard, it will be noted the combined chromium content of base metal and filler material was 6.55%.

EXAMPLE III

Using a nickel-copper-chromium plate material containing 2.8% chromium and a filler material containing 2.88% chromium, the technique described in connection with Example I was again used to butt weld ½ inch thick plates. Base plate, filler metal, and weld deposit composition are set forth in Table III:

TABLE III

| Weld component | Ni, percent | Cr, percent | Mn, percent | Si, percent | Ti, percent | Zr, percent | Fe, percent | Cu, percent |
|---|---|---|---|---|---|---|---|---|
| Base plate | 30.1 | 2.80 | 0.78 | 0.045 | 0.08 | 0.81 | 0.15 | Bal. |
| Filler metal | 29.6 | 2.88 | 0.67 | 0.33 | 0.01 | 0.73 | <0.01 | Bal. |
| Weld deposit | 29.6 | 2.82 | 0.66 | 0.26 | 0.024 | 0.77 | 0.06 | Bal. |

NOTE: Bal.=Balance essentially copper and impurities.

In contrast to Examples I and II, X-ray examination of the weld deposit and polished and etched transverse slices taken therefrom did not reveal cracking. However, upon pulling tensile bars used to determine the strength and ductility characteristics of the deposit, defects on the fractured surfaces of the bars were noted. These defects were not of the fibrous type but were rather akin to discontinuities, although the defects were not deemed of major consequence. In any event, the weld deposit could not be classified as being completely acceptable although, as a practical matter, it was relatively good, a result attributable to the low chromium content in the base metal (2.8%) and in the filler metal (2.88%) and the higher silicon content (0.33%) of the filler.

EXAMPLE IV

Following the technique described in Example I, additional ½ inch thick plates were butt welded in the heavily restrained condition. The composition of the base plate, filler metal, and weld deposit are reported in Table IV:

TABLE IV

| Weld component | Ni, percent | Cr, percent | Mn, percent | Si, percent | Ti, percent | Zr, percent | Fe, percent | Cu, percent |
|---|---|---|---|---|---|---|---|---|
| Base plate | 29.1 | 3.75 | 0.43 | 0.05 | 0.10 | 0.82 | 0.20 | Bal. |
| Filler metal | 30.3 | 2.60 | 0.56 | 0.36 | 0.05 | 0.67 | 0.04 | Bal. |
| Weld deposit | 29.6 | 2.80 | 0.56 | 0.28 | 0.04 | 0.83 | 0.06 | Bal. |

NOTE: Bal.=Balance essentially copper and impurities.

In this example the chromium content of the filler material was lower, 2.6%, than in any of the previous tests. The silicon content of the filler metal, 0.36%, was also higher than in either of Examples I or II.

The sluggishness experienced with Examples I and II was not encountered and the overall appearance of the solidified weld deposit was visually improved, no visual cracks being noted. Nor upon X-ray analysis did the welded joint evidence any cracking, porosity or other defect. Examination of polished and etched transverse slices cut from the weld deposit confirmed the radiographic observation that the joint was of high quality. In terms of mechanical characteristics, the weld deposit exhibited a yield strength (Y.S.) of 55,800 p.s.i. (0.02% offset), an elongation (El.) in 1 inch of 18.2%, a reduction of area (R.A.) of 56% and a Charpy V-notch (C.V.N.) impact resistance of 60 foot-pounds (ft.-lbs.). No defects were noted (as in the case of Example III) in the fractured surface of the tensile bar. A ¼ inch thick side bend specimen of the weld was bent 180° about a one inch diameter pin. Even when so deformed, examination revealed but two minuscule cracks less than $\frac{1}{16}$ inch in length. This further reflected the excellent ductility of the joint and high quality of the deposit.

The data concerning other successful butt welds are given in Tables V and VI, the same procedure being used as in connection with Example I.

TABLE V

| Example | Weld component | Ni, percent | Cr, percent | Mn, percent | Si, percent | Ti, percent | Zr, percent | Fe, percent | Cu, percent |
|---|---|---|---|---|---|---|---|---|---|
| 5 | Base plate | 29.1 | 3.75 | 0.43 | 0.05 | 0.10 | 0.20 | 0.82 | Bal. |
|   | Filler wire | 30.3 | 2.60 | 0.56 | 0.36 | 0.04 | 0.04 | 0.67 | Bal. |
|   | Weld deposit | 29.6 | 2.80 | 0.56 | 0.28 | 0.04 | 0.06 | 0.83 | Bal. |
| 6 | Base plate | 30.1 | 2.80 | 0.78 | 0.045 | 0.08 | 0.15 | 0.81 | Bal. |
|   | Filler wire | 30.3 | 2.60 | 0.56 | 0.36 | 0.05 | 0.04 | 0.67 | Bal. |
|   | Weld deposit | 30.3 | 2.60 | 0.58 | 0.28 | 0.034 | 0.09 | 0.80 | Bal. |
| 7 | Base plate | 30.1 | 2.80 | 0.78 | 0.045 | 0.08 | 0.15 | 0.81 | Bal. |
|   | Filler wire | 30.7 | 1.95 | 0.57 | 0.37 | 0.047 | <0.05 | 0.71 | Bal. |
|   | Weld deposit | 30.3 | 2.38 | 0.64 | 0.23 | 0.033 | 0.08 | 0.79 | Bal. |
| 8 | Base plate | 29.1 | 3.75 | 0.43 | 3.05 | 0.10 | 0.20 | 0.82 | Bal. |
|   | Filler wire | 30.7 | 1.95 | 0.57 | 0.37 | 0.047 | <0.05 | 0.71 | Bal. |
|   | Weld deposit | 30.6 | 2.25 | 0.57 | 0.18 | 0.05 | <0.01 | 0.88 | Bal. |
| 9 | Base plate | 30.1 | 2.80 | 0.78 | 0.045 | 0.08 | 0.15 | 0.81 | Bal. |
|   | Filler wire | 29.7 | 2.75 | 1.00 | 0.23 | 0.05 | 0.09 | 0.72 | Bal. |
|   | Weld deposit | 29.8 | 2.53 | 1.00 | 0.26 | 0.06 | 0.08 | 0.75 | Bal. |
| 10 | Base plate | 29.5 | 3.15 | 0.66 | 0.15 | <0.05 | 0.09 | 0.73 | Bal. |
|   | Filler wire | 30.0 | 2.70 | 0.68 | 0.32 | 0.04 | 0.04 | 0.74 | Bal. |
|   | Weld deposit | 29.6 | 2.70 | 0.69 | 0.33 | 0.03 | 0.038 | 0.74 | Bal. |

TABLE VI

| Example | Y.S., ks.i. | U.T.S., ks.i. | El., percent | R.A., percent | C.V.N., ft.-lbs. |
|---|---|---|---|---|---|
| 5 | 55.8 | 80.6 | 18.2 | 56.0 | 60 |
| 6 | 56.8 | 80.4 | 21.0 | 53.2 | 76 |
| 7 | 51.9 | 75.4 | 18.0 | 53.2 | 71 |
| 8 | 50.5 | 76.2 | 17.0 | 53.2 | 91 |
| 9 | 58.7 | 83.5 | 20.0 | 43.0 | 66 |
| 10 | 57.1 | 79.8 | 14.5 | 30.5 | 64 |

As can be seen from a perusal of the data presented in Table VI, the welded joints exhibited a yield strength in excess of 50,000 p.s.i., good ductility, and a resistance to impact which generally exceeded 60 foot-pounds. It should be mentioned that the Charpy V-notch impact specimens were cut from the weld interface in the as-welded condition and the tensile fractures occurred in the weld deposit.

Transverse slices about ½ inch in width were cut from each weld of Examples 5 through 9 and then ground, polished and examined (30 magnification) for defects. Examination thereof confirmed prior radiographic observation that the joints were of the highest quality. Also, ¼ inch side bend specimens were cut from each weld and bent 180° about a one inch diameter steel pin. No side bend specimen exhibited any serious cracking, thus again illustrating the excellent ductility of the joint and high quality of the weld deposit.

It should be pointed out that the mechanical characteristics given in Table VI represent properties of the weld deposit without benefit of a postweld heat treatment having been applied thereto. This is a definite plus since many structural applications render postweld heat treating impractical because of, inter alia, massiveness of the welded structure or the location thereof or the risk of detrimental dimensional change from reheating, etc. The yield strength of the welded joint can, however, be increased, if necessary, to some extent by postweld heat treatment in which the joint is heated from about 800° F. to about 1000° F. for ½ hour to about 2 hours, e.g., about 900° F. for about one hour. It is to be understood that postweld heat treatments are not excluded from the invention, the important point being that they are not required. It should be further added that the mechanical properties of welds formed in accordance with the invention are quite comparable to those of the base metal although the difference in the respective chromium contents of the base metal and welding element should be held to a minimum. In welding sheet and in the absence of heat treatment, the strength of a welded joint is likely to be a few thousand pounds per square inch below that of the base metal.

To simulate the severe conditions imposed in welding heavy sections, X-weld crack tests were performed, again using the inert gas shielded tungsten-arc welding technique. (The complete description of this test and illustrations thereof are found in The Welding Journal, vol. 24, November 1946, pp. 769S-775S.) While several successful tests were conducted, it is sufficient for purposes herein to set forth one successful test and also a test in which cracking did occur. In making the X-weld crack test, two 1 inch-square x 3-inch long bars were clamped with their edges together to form an X joint. The composition of the base metal (same in both tests), filler material, and weld deposit are given in Table VII.

TABLE VII

| Example | Weld component | Ni, percent | Cr, percent | Mn, percent | Si, percent | Ti, percent | Zr, percent | Fe, percent | Cu percent |
|---|---|---|---|---|---|---|---|---|---|
| 11 | Base plate | 29.3 | 2.95 | 0.71 | <0.07 | <0.07 | 0.13 | 0.74 | Bal. |
|  | Filler wire | 30.1 | 2.70 | 0.69 | 0.24 | 0.05 | 0.06 | 0.74 | Bal. |
|  | Weld deposit | 29.6 | 2.75 | 0.78 | 0.22 | 0.05 | 0.05 | (¹) | Bal. |
| 12 | Base plate | 29.3 | 2.95 | 0.71 | <0.07 | <0.07 | 0.13 | 0.74 | Bal. |
|  | Filler wire | 30.2 | 2.75 | 0.69 | 0.65 | 0.06 | 0.11 | 0.73 | Bal. |
|  | Weld deposit | 29.5 | 2.75 | 0.79 | 0.57 | 0.06 | 0.11 | (¹) | Bal. |

¹ Not determined.

During welding, passes were laid in, two at a time, on alternate sides of the joint, allowing the specimens to cool to about 100° F. between passes. The specimens were clamped during the early part of the test but subsequently were left unclamped for the balance thereof. Each pass was examined visually and on completion transverse slices were cut therefrom.

In both instances, general visual observation did not reveal any cracks. While examination of the transverse slices (about 30×) failed to reveal any cracks in connection with the weld deposit of Example 11, approximately 5.8 cracks per face examined were detected in respect of Example 12. In this connection, it will be noted that the silicon content of the filler material was 0.65%. As indicated hereinbefore, excess silicon can contribute to cracking. It should also be mentioned that a transverse slice of the weld deposit of Example 11 was bent 180° about a ½ inch diameter pin, no cracks being detected.

While the tests and data set forth above herein pertain to the gas shielded tungsten-arc process (TIG), welding was also quite successfully conducted using the gas metal arc welding technique (MIG). Thus, butt welds were made in the flat position on ½ inch base plate using argon as the inert shielding gas in conjunction with a conventional automatic (all previous tests were manual) metal arc (bare consumable electrode) welding torch.

The plates were again ½ inch in thickness, 2 inches in width, and 6 inches in length and were beveled at a 30° angle and had a ¹⁄₁₆ inch root and ¹⁄₁₆ inch root space. The plates were heavily restrained by four U straps to a 2 inch thick steel platen. The joint was completed in six passes, the filler wire used being 0.062 inch in diameter which was fed in at a rate of about 200 inches per minute. The travel speed of the torch was approximately 13 inches per minute, with the amperage being 285 amps. and the gas flow approximately 40 cubic feet of argon per hour. The only preparation between weld passes was removal of a nontenaceous black oxide film wire-brushing. The composition of the base plate, bare consummable electrode, and weld deposit are given in Table VIII.

TABLE VIII

| Example | Weld component | Ni, percent | Cr, percent | Mn, percent | Si, spercent | Ti, percent | Zr, percent | Fe, percent | Cu, percent |
|---|---|---|---|---|---|---|---|---|---|
| 13 | Base plate | 29.5 | 3.15 | 0.66 | 0.15 | <0.05 | 0.09 | 0.73 | Bal. |
|  | Electrode | 30.3 | 2.60 | 0.56 | 0.36 | 0.05 | 0.04 | 0.67 | Bal. |
|  | Weld deposit | 30.5 | 2.65 | 0.58 | 0.28 | 0.05 | 0.054 | 0.73 | Bal. |

In terms of mechanical characteristics, the weld deposit of Example 13 exhibited a yield strength of 58,400 p.s.i., a tensile elongation of 19.5%, a reduction of area of 49.5% and a Charpy V-notch impact strength of approximately 69 foot-pounds. X-ray examination showed the weld to be free from all defects. Sectioning of the weld into transverse slices and examination at 30 magnification confirmed the radiographic results. A ¼ inch side bend specimen was bent 180° about a one inch diameter steel pin and no defects were observed.

Corrosion resistance of weld deposits in accordance herewith compare very favorably with that of the 70–30 base materials. In this connection, a series of welds were prepared and tested for a period of six months in sea water to determine their resistance to stress corrosion cracking. Base plates ½ inch thick and of a composition containing 30.1% nickel, 2.8% chromium, 0.78% manganese, 0.05% silicon, 0.08% titanium, 0.15% zirconium, 0.81% iron, and the balance essentially copper were welded with four different filler materials which differed mainly in chromium content. These filler materials contained about 1.95%, 2.60%, 2.88%, and 3.30% chromium. The corresponding weld deposits formed therefrom contained about 2.4%, 2.6%, 2.8% and 3.2% chromium, respectively. Each of the welds was formed into a U bend, bolted at the extremities, and immersed in quiet sea water for a period of six months. Upon removal therefrom, visual examination reflected that there was no evidence of stress corrosion cracking. Since this test is deemed to be somewhat severe, it could be said the corrosion resistance was generally quite good. However, it was observed that the welds containing less chromium than the base metal were apparently cathodic at least to some extent in relation to the base metal. This is a desirable characteristic. In contrast thereto, the weld deposit containing 3.2% chromium (formed from the filler material containing 3.3% chromium) versus the 2.8% chromuim level of the base material indicated that the deposit was slightly anodic in this instance. Accordingly, this additional data further emphasizes the significance of maintaining the chromium content in the filler material at a level below about 2.8% since the anodic condition is indicative of a shortened weld life in view of the fact that the weld deposit would corrode in preference to the base material.

The welding elements or processes contemplated within the invention can be used to weld chromium strengthened 70–30 cupronickel alloys for a wide variety of structural applications, including salt water piping, heat exchangers, thin walled tubes, sheets, stills, condensers, containers resistant to alkali corrosion, and other applications as will be readily apparent to those skilled in the art. In addition, tungsten inert gas welds and short circuiting gas metal arc welds can be made both in the flat and out-of-position, e.g., vertical, overhead, horizontal, etc.

The specific composition of the 70–30 cupronickels which can be readily welded with the welding elements of the invention generally contain about 24% to 38% nickel, at least 2.8% to 3.8% chromium, up to 2.5%, e.g., up to 1% iron, up to 2.5% cobalt, up to 6% zinc, up to 3% manganese, up to about 0.8% zirconium, up to about 0.5% silicon, up to about 0.5% each of titanium, aluminum, columbium, and beryllium, up to about 0.1% carbon, up to about 0.1% magnesium, the balance being essentially copper. It is preferred that the sum of chromium, iron, and cobalt contents not exceed about 5% in the base alloy.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. As a new article of manufacture, a welded structure comprised of at least two chromium-strengthened copper-nickel alloy members in which the chromium content is present in an amount within the range of 2.8% to 3.8% and sufficient to ordinarily promote weld cracking, and in which the nickel content is from 24% to 38%, said members being joined by a weld deposit characterized in that it possesses a yield strength of at least about 40,000 p.s.i. and formed by welding said members with a welding element formed of an alloy having a face centered cubic microstructure and containing about 26% to 37% nickel, from 1.9% to 2.75% chromium, the total chromium of the base alloy and welding element not exceeding 6%, from 0.4% to 2% manganese, about 0.2% to less than 0.6% silicon, titanium in a small but effective amount up to 0.5%, zirconium in a small but effective amount up to 0.3%, up to about 1% iron, up to about 0.1% carbon, and the balance essentially copper.

2. A welded structure in accordance with claim 1 in which the welding element contains about 2.3% to 2.7% chromium, from 0.6% to 1.5% manganese, about 0.25% to 0.5% silicon, about 0.02% to 0.5% titanium, and about 0.02% to 0.3% zirconium.

3. A welded structure in accordance with claim 1 in which the welding element contains about 28% to about 32% nickel.

4. A process for welding chromium-strengthened copper-nickel-base alloys containing about 24% to 38% nickel and from 2.8% to 3.8% chromium, with a chromium containing welding element which comprises using as the welding element a copper-nickel alloy in which the chromium content is less than 2.8% and is correlated with the chromium level of the base alloy such that the total does not exceed 6.4%, the welding element also containing at least 1.9% chromium, at least 0.4% and up to 2% manganese, about 0.2% to less than 0.6% silicon, titanium in an amount up to 0.5%, zirconium in an amount up to 0.3%, up to 1% iron, up to 0.1% carbon, and the balance essentially copper, and thereafter arc welding the copper-nickel base alloy with the said welding element under an inert gas shield whereupon sound, ductile, tough, substantially crack free, nonporous weld deposits are obtained.

5. A process in accordance with claim 4 in which the nickel content of the welding element is from 28% to 32%, the manganese is from 0.6% to 1.5%, and the silicon is from 0.25% to 0.5%.

6. A process in accordance with claim 5 in which the combined chromium content on the base alloy and welding element does not exceed 6%.

References Cited

UNITED STATES PATENTS

| | | | |
|---|---|---|---|
| 2,772,963 | 12/1956 | Pease et al. | 75—159 |
| 2,834,098 | 5/1958 | Pease et al. | 29—199 X |
| 2,891,860 | 6/1959 | Woolard | 75—159 |
| 3,053,511 | 9/1962 | Godfrey | 75—159 |
| 3,253,911 | 5/1966 | Cairns | 75—159 |

FOREIGN PATENTS

| | | | |
|---|---|---|---|
| 338,676 | 11/1930 | Great Britain | 75—159 |
| 866,456 | 4/1961 | Great Britain | 75—159 |

CHARLES N. LOVELL, Primary Examiner

U.S. Cl. X.R.

75—153, 159; 219—137, 145

PO-1050
(5/69)

UNITED STATES PATENT OFFICE
CERTIFICATE OF CORRECTION

Patent No. 3,545,945      Dated December 8, 1970

Inventor(s) WALTER ADRIAN PETERSEN

It is certified that error appears in the above-identified patent and that said Letters Patent are hereby corrected as shown below:

Column 5, Table III, reverse column headings, for "Zr %  respectively, read --Fe %  Zr %-- respectively.

Column 6, Table IV, reverse column headings, for "Zr %  respectively, read --Fe %   Zr %-- respectively.

Column 6, Table V, under column heading "Si,percent" Exam for "3.05" read --0.05--.

Signed and sealed this 4th day of January 1972.

(SEAL)
Attest:

EDWARD M. FLETCHER, JR.
Attesting Officer

ROBERT GOTTSCHALK
Acting Commissioner of Pate